July 11, 1967  MINORU SUDA  3,330,606

ANTIFRICTION BEARING FOR SLIDING MEMBERS

Filed Dec. 16, 1964

INVENTOR.
MINORU SUDA 3,330,606
ANTIFRICTION BEARING FOR SLIDING
MEMBERS
Minoru Suda, 193 1-chome, Tamagawa, Todoroki-machi,
Setagaya-ku, Tokyo, Japan
Filed Dec. 16, 1964, Ser. No. 418,684
Claims priority, application Japan, Jan. 11, 1964,
39/950
7 Claims. (Cl. 308—6)

The invention relates to a bush or bearing assembly for supporting and guiding a shaft for linear motion, as required in many machines. The bush according to the invention differs from the usual metal bushing in that many balls, circulating axially in bearing contact with the bush and the shaft along three or more circumferentially spaced portions of the inner surface of the bush, are arranged.

When an antifriction type of bush is used to provide for linear or axial movement of a shaft in a machine, it is possible to maintain high performance operation of the machine over a long period, since sliding friction between the bush and the shaft is changed into rolling friction resulting in greatly decreased wear due to frictional forces. Additionally, high precision and performance of a machine can be obtained with only a slight clearance between the bush and the shaft and sometimes with no clearance at all, resulting in an increase of the load resisting strength of the machine. It is also possible to keep the cost of these antifriction bushes low, using mass production, since this type of bush can be used as a precision machine part in the general mechanical field whereby it is of general practical utility.

There are various known forms of antifriction bushings, among which may be mentioned the Thomson Industries bush manufactured and used in both the United States of America and Japan. Another antifriction bush is manufactured in Switzerland and sold under the trade names "Sferax" or "Rorax." However, these bushes are not completely satisfactory in performance, and additionally are very expensive in comparison with the usual radial ball bearings as well as being limited as to applicability.

The present inventor has also developed an antifriction bush characterized by a ball retainer comprising a thin cylinder, and this has been produced commercially. However, the bush of the present invention has a higher performance than the usual bushes and can be produced at a greatly decreased cost as well as being able to increase the performance of many machines.

Known antifriction bushes have many advantages as well as an equal number of disadvantages. For example, in the case of an antifriction bush produced commercially by Thomson Industries, the outer sleeve is deformed by press working and three or more axial convex portions on the inner surface of said outer sleeve are formed in order to guide the balls to circulate repeatedly in the axial direction and having bearing engagement with said inner surface and the shaft. Plates with oblong guide grooves for the circulation of balls, formed by press working, are arranged axially along convex portion. In order to make said outer sleeve and said plates for retaining balls a unitary structure, rings are force-fitted through said plates at both ends of said outer sleeve. With this type of bush, having a structure and components as mentioned, it is difficult to provide high precision and to form guide grooves in the plates with high precision, since there is present deformation due to residual internal stresses caused by the press working. The structure cannot provide an outer sleeve and the plates as a strong unit, so that these two parts very often separate and are damaged under high loads. Additionally, the ends of the thin cylindrical outer sleeves are deformed when the rings are force-fitted through the plates. It is frequently impossible to use a bush of this type as a precision machine part, because the precision of the dimensions of the outer sleeve is decreased during assembly.

In the case of the type of bush known as "Sferax," etc. the convex surfaces on the inner surface of the outer sleeve, used for circulation of the balls, are formed by cutting metal from the inner surface of the outer sleeve. No concave grooves preventing precise working on the axial outer surface are formed, and there are no residual stresses caused by working. Instead, the precision of dimensions of said outer sleeve is obtained by grinding after quenching. The ball retainer is fitted into the inner surface of said outer sleeve, and has axially extending elliptical or oblong guide grooves formed by milling, for the circulation of balls mounted in the grooves. Locating and fixing of said ball retainer in said outer sleeve in the axial or circumferential directions are effected by rings force-fitted between the parts at both ends. In this kind of bush, said outer sleeve and said ball retainer are formed not by press working but by cutting, so that the precision of dimensions required is easily attained. It is, however, inevitable that the cost of working is increased in comparison with usual bushes. In particular, the oblong guide grooves on the ball retainer have radially uneven depths in the circumferential direction, so that milling thereof requires a very long time, and it is not easy to mill said guide grooves with high precision. The precision of dimensions of said outer sleeve and said retainer cannot be held in case rings are force-fitted in order to make them a strong unitary structure. Moreover, by such a way, it is difficult to make the parts a strong unitary structure with high precision, and to produce an excellent bush with high performance and durability under high load.

In the type of bush previously invented by the present inventor, the axially extending convex portions of the inner surface of the outer sleeve, providing for the circulation of the balls, are formed by metal removal from the remainder of the inner surface of the outer sleeve. Thereby, high precision of the dimensions of the outer sleeve is secured. The ball retainer is a cylindrical plate formed with guide grooves for the circulation of balls. The principal purpose of the inventor's prior construction, is to attain a strong unit of the retainer and outer sleeve by indexing said retainer by axially extending convex or concave portions on the inner surface of said outer sleeve. It is, however, difficult to produce, with low cost and high performance, a ball retainer made of a thin cylindrical element. Namely, in case the guide grooves are formed on the outer surface of the thin cylinder by bulge working, the possible elongation of the element is not sufficient to provide for the formation of complete guide grooves, since the deformation of the thin cylindrical retainer requires a large elongation. In turn, this prevents obtaining a normal circulation of balls when the bush is fitted on the shaft.

The thin cylindrical ball retainer is formed by deep drawing of a steel plate before bugle working and annealing. Afterwards, the retainer is strengthened by cementation and quenching, which follow the bulge working. The large number of process steps results in a correspondingly high cost. Particularly in the case of a small bush having a working bore of less than 10 mm., the production of tools and obtaining of the required strength is difficult when long axially extending apertures, corresponding to the range where the balls circulate in bearing contact with the convex portions of the inner surface of the outer sleeve and the shaft, are punched out.

The present invention is directed to an antifriction bush providing linear displacement of a shaft and free of the disadvantages of prior art bushes of this type, as well as having a high performance and a low manufacturing cost.

For an understanding of the principles of the invention, reference is made to the following description of a typical embodiment thereof as illustrated in the accompanying drawings.

Figure 2:
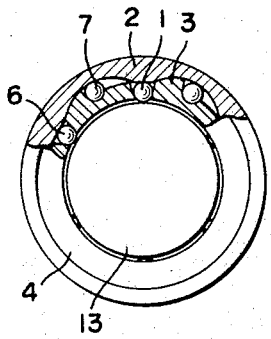
FIG. 2 is an end elevation view, partly in section, corresponding to FIG. 1.
Figure 1:
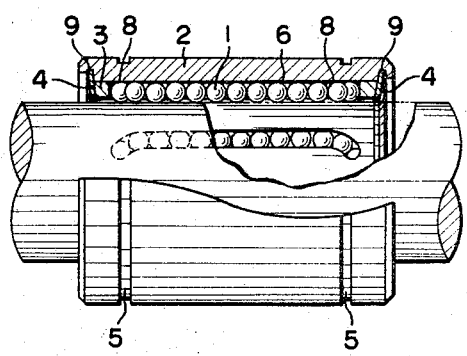
FIG. 1 is a side elevation view, partly in section, of a bush embodying the invention as mounted on a shaft.
Figure 3:
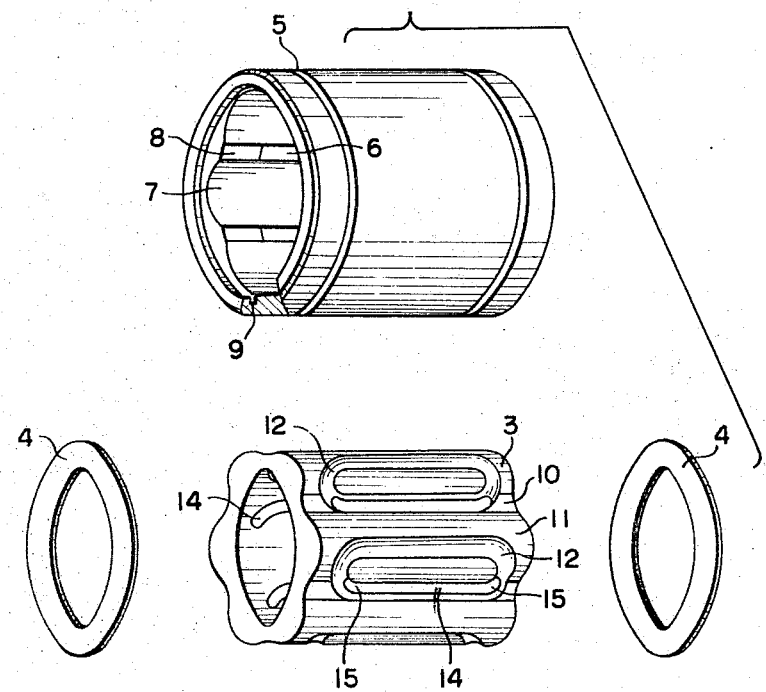
FIG. 3 is an exploded perspective view of the invention bushing but without the antifriction balls.

Referring to the drawings, the antifriction bush of the invention includes antifriction balls 1, an outer sleeve 2 and and inner sleeve 3 serving as a ball retainer. Rings 4 are provided at each end of the assembly to anchor the inner and outer sleeves relative to each other to form a unit. The outstanding feature of the bush shown in FIGS. 1, 2 and 3 is its simplicity and the fact that the ball retainer 3 is formed by sintered metal powder metallurgy.

Outer sleeve 2 is cylindrical and has a cylindrical outer surface which is uninterrupted except for the two or more annular grooves 5 which receive snap rings to anchor sleeve 2, and the bush, to the machine, grooves 5 being formed adjacent the two ends of the bush. The interior surface of outer sleeve 2 is formed with at least three axially extending convex surface portions 6 alternating circumferentially with concave surface portions 7. The convex portions 6 are formed with reliefs 8 having a slight inclination as necessary for circulation of the balls 1. Annular grooves 9 are formed at both ends of outer sleeve 2 and serve as seats for the anchoring rings 4.

The inner sleeve 3 is generally annular in cross section and its outer surface is formed with axially extending concave surface portions 10 alternating with axially extending convex surface portions 11. The balls 1 circulate along elliptical or oblong tracks on retainer 3, these tracks being formed by grooves 12 in convex surface portions 11, the grooves 12 being incomplete and having their opposite ends interconnected by slots 14 extending completely through the sleeve 3 and have a width somewhat less than the diameter of balls 1. These elongated apertures 14 provide for axial circulation of balls 1 in bearing contact with convex portions 6 of outer sleeve 1 and shaft 13. The inner surface of inner sleeve or ball retainer 3 is a simple cylindrical surface interrupted only by the axially extending apertures 14 which have arcuate end portions 15 leading into the grooves 12. While the inner surface of inner sleeve 3 is, as stated, a simple cylindrical surface, there may be some roughness of the inner surface in the event the inner sleeve is former by powder metallurgy.

The rings 4, which anchor the inner and outer sleeves to each other, are dished annular springs formed of thin plates which are hardened by quenching. These plates are snapped into grooves 9 and lie flat against the frustoconical end surfaces of the inner sleeve or ball retainer 3.

In the assembly of the parts, the concave portions 7 of the inner surface of outer sleeve 2 are registered with the convex portions 11 of the outer surface of inner sleeve 3 and the parts are fitted with the placing of balls into guide grooves 12 of inner sleeve 3. When sleeves 2 and 3 are properly assembled, rings 4 are fitted into grooves 9 near both ends. Then, the balls may circulate with a slight clearance between the guide grooves and the inner surface of outer sleeve. The slight clearance is necessary for inserting balls in said guide grooves in assembly.

Structural features of a bush according to the invention, in comparison with usual bushes, are that the ball retainer is a thick cylinder with a thickness equal to the diameter of the balls and that the axially extending convex portions, registered with axially extending concave portions on the inner surface of outer sleeve, which are both necessary for the circulation of balls, are formed on the outer surface of retainer 3.

The foregoing features have the following effects. Without deleteriously affecting the dimensional precision of outer sleeve 2, the inner sleeve 3, serving as a ball retainer, and the outer sleeve 2 can be united into a unitary assembly in a simple manner. Thus, inner sleeve 3 is located at a precise angular relation with respect to outer sleeve 2 by registery between the axially extending convex portions on one sleeve and the axially extending concave portions on the other sleeve. Fixing of the two parts against relative axial movement can be effected by screws, snap rings, and rings in the form of dish-shaped springs or rings having screws on their inner surface. If rings are used for fixing the two parts against relative axial displacement, it is not necessary that circumferential positioning of the retainer relative to the outer sleeve be effected precisely at the same time as axial location of the retainer with respect to the outer sleeve, as is necessary in bushes of the usual type.

The inner sleeve of the bush according to the invention is a thick cylinder so that it is also not necessary that it be strengthened, during assembiy by the rings, as would be the case if it were made of plates or were a thin cylinder. No correction of deformation or checking of the roundness of the inner sleeve is required. Moreover, without force-fitting of rings having a substantial axial thickness, as in usual bushes, a strong unitary assembly can be attained by very thin rings. No radial forces caused by the rings act on the bush in and after assembly so that there is no degradation of the dimensional precision of the outer sleeve, though there is some such degradation in uniting usual bushes into a unitary assembly.

In locating the inner sleeve axially relative to the outer sleeve, the manner rings in the form of dish springs, as shown in the drawings, will be described.

Rings like dish springs are fitted in the grooves 9 near both ends of outer sleeve 2, after balls 1 are entered into the guide grooves and inner sleeve 3 is fitted into outer sleeve 2. If the inner sleeve is formed with frusto-conical annular ends, as shown in the drawings, the radial cross section of rings 4 remains the same before and after insertion. Deformation of rings 4 engaged in grooves 9 is prevented by grooves 9 and by inner sleeve 3. Accordingly, after assembly, inner sleeve 3 is not only located at a precise axial position relative to outer sleeve 2 by rings 4, but also is anchored into a strong unitary assembly with outer sleeve 2 by the axially directed elastic force of the rings with no clearance. In case inner sleeve 3 is subjected to axial force through balls 1, rings 4 are not subjected to deformation, unless very large axial forces, according to the lever principle act on them, since the end surfaces of the thick cylindrical retainer 3 are slightly conical so that axial forces are concentrated near portions of the circumference thereof.

More particularly, the inner sleeve or retainer 3 is not subjected to successive axial forces due to circulation of balls 1, so that the inner and outer sleeves can be maintained as a unit by the relatively thin dish-shaped rings 4.

In comparison with known bushes, the number of balls circulating in bearing contact with the inner surface of the outer sleeve and with the shaft can be increased by ten to twenty percent, so that shaft movement is more stabilized and the load to which the bush is subjected can be made larger. More specifically, the fixing of the inner ball retainer sleeve axially with respect to the outer sleeve is effected by thin rings, of the nature of snap rings or dish springs, so that the length of the axially extending guide grooves in the inner sleeve can be increased as compared with the length of grooves in prior art bushes. In these prior art bushes, the inner sleeve is usually anchored axially relative to the outer sleeve by rings which are force fitted at both ends of the assembly, and these rings have a substantially larger axial thickness than the rings 4 of the present invention. The increased thickness is necessary to allow the frictional force between the parts to augment the holding effect of the rings. However, the axial length of the ball paths of the retainer has to be shortened by an amount corresponding to the increased thickness of the retaining rings.

In the prior bush construction developed by the present inventor, the ball retainer is a thin cylinder, and circumferential registering and anchoring are effected by registering axial extending convex and concave portions of the inner and outer cylinders. The rings are inserted through the retainer and must be fixed by screws to prevent deformation of the outer sleeve in assembly. Deformation of the relatively thin inner retainer must be avoided and precise roundness is required, so that anchoring of the two parts to form a unit cannot be effected by relatively thin rings.

With the present construction, deep guide grooves can be provided for the circulation of the balls, and with high precision. Therefore, the balls circulate, without uneven flow, along the center line of the grooves. In this kind of bush, especially, it is characteristic that the great decrease of frictional force is obtained by changing sliding friction into rolling friction. Accordingly, resistance caused by the uneven circulation of balls must be avoided. Prior bushes of this type have shallow grooves, so that it has been necessary to provide grooves in both the inner and outer sleeves, in order properly to guide the balls during their circulation. It is difficult to form grooves in the retainer with a high precision, and it is also difficult to provide the proper precision between the combined grooves of the inner and outer sleeves. As a result, circulation of the balls has rarely been even and uniform.

By contrast, in the bush of the present invention and as particularly seen in FIG. 2, the depth of the grooves 12, throughout their length, is sufficient that the width of the grooves at the radially outer limits thereof are equal to the diameter of the balls throughout the entire length of the grooves. Additionally, the precision with which the outer sleeve and the inner sleeve can be registered in both the axial and circumferential direction is very high. In prior art bushings in which the guide grooves are formed by press working on plates of a cylindrical retainer, the elongation of the retainer limits the depth of the grooves to about ⅓ the diameter of the ball. This is apparent to those skilled in the art who are acquainted with anti-friction bushes of this type.

In particular, with respect to the mentioned "Sferax" bushes, it is difficult to secure dimensional precision of the grooves, even though the depth of the grooves can be increased by milling. A further disadvantage is that these known bearings are not formed for high precision angular registration of the inner and outer sleeves.

The increased thickness of the inner sleeve or ball retainer of the invention provides for the bush to be used under very high loads. In prior bushes, the guide grooves for ball circulation are formed in plates or in a thin cylindrical ball retainer, and such a retainer deforms under high load and may furthermore be damaged by the balls themselves. In the present bush, the convex axially extending portions of the retainer or inner sleeve contact with the inner concave axially extending surfaces of the outer sleeve, thereby greatly reinforcing the bush against damage due to external forces. Furthermore, there is no danger of damage due to slipping of the retainer out of the outer sleeve and due to disturbance of the circulation of balls 1.

In accordance with the invention, the inner sleeve or ball retainer 3 is formed of metal powder. In prior art bushes, the configuration and contours of the container make it difficult, if not impossible, to form the retainer with high dimensional precision. The ball retainer of the invention bush likewise has a complicated configuration, as will be apparent from the drawings, so that it is not easy to form the same by cutting or milling operations.

The formation of the retainer by metal powder metallurgy, however, makes it possible to easily provide the retainer 3 by proper attention to the die configuration and the die pressures.

This makes it possible to form the retainer 3 with high dimensional precision, as compared to the prior art. In the prior art, wherein the ball retainer is formed by press working or cutting, the elongation prevents the guide grooves from being formed with the required depth, so that the depth of the groove is usually shallow and there is a great deal of wear of the forming die. The cost of the die, per unit produced, is high, and the shallowness of the guide grooves forces the die to take the shape of the inner surface of the outer sleeve. Consequently, formation of the retainer by a pressed die, as in the prior art, makes it difficult to provide and retain a high precision.

In case the guide grooves are formed by cutting, the tolerance must be as large as allowed in order to diminish the working cost, since cutting process requires repeated passes.

In cutting the guide grooves on the external surface of the inner sleeve or ball retainer, the depth of the groove is uneven in the circumferential, axial, and radial directions, so that it is very difficult to make precise repeated cutting passes. By contrast, by forming the retainer by powder metallurgy, the disadvantages of forming the retainer by machining are avoided, and there is very little damage or wear to the dies so that the dies can be used to produce a large number of high precision retainers at a relatively small working cost.

The dimensional precision of a retainer formed by metal powder metallurgy is high. Particularly, if ferrite or copper are used for the retainer, the contraction percentage, during cementation, is limited to 1–2%. A ball retainer with a high precision to 0.01 mm. may be obtained by re-working after cementation.

An additional advantage of using powder metallurgy to form the ball retainer is the decreased cost of the powder as compared to steel, for example. Additionally, both the inner and outer surface configurations of the retainer can be formed simultaneously using powder metallurgy. The only step remaining after cementation of the powder is the formation of the slots.

In case long slots, for the balls to have contact with the shaft, are formed in plates or in a thin cylindrical element, after the guide grooves are cut, a die operation is required. The die for the slots must be manufactured according to the lengths of the slots. The production of the die is not easy, and the punch operation using the die requires skill.

The maintenance of the strength of the die makes it difficult to produce in the case of thin cylindrical ball retainers with working bores of less than 10 mm.

The slots in the ball retainer according to the invention are formed by cutting the inner surface after cementation of the metal powder, so that the punch working is not necessary. Therefore, even in the case of very small bushes with working bores of 3 mm., the ball retainer can be easily produced.

An additional advantage of the present invention is that the noise of the bush, during operation can be greatly reduced. During the continuous circulation of the balls along the guide grooves, noises are generated by impact between the balls and the balls and the guide grooves, as well as due to the intermittent contact of the balls with the inner surface of the outer sleeve. The noise due to impact between the balls and the guide groove is frequently louder than that due to impact between the balls themselves, as can be distinctly seen in bushes using thin cylindrical ball retainers or plates. By forming the ball retainer by powder metallurgy, as in the present invention, the development of noise is greatly diminished. Thus, for example, in office machines, medical instruments, electronic instruments, and the like, where the noise level must be kept very low, the bushes of the present invention provide much better results than those of the prior art.

Furthermore, lubricating oil can be incorporated in the ball retainer, thus reducing the frequency with which it is necessary to lubricate the bush. In prior art bushes, lubricating oil must be supplied at frequent intervals if it is desired to obtain smooth movement of the shaft without wear. This is a particular advantage of the present invention as applied to machines where it is difficult to obtain access to supply oil to a bush.

In case of the ball retainer formed by using ferrite as powder, there can be obtained a strong retainer, strengthened and hardened easily by cementation and quenching, and with little deformation caused by heat treatment.

If corrosion resistance is required, it can easily be provided by proper selection of the powder from which the retainer is formed.

The invention relates to a bush in which balls 1 circulate repeatedly at three or more circumferential portions, in bearing contact with the inner surface of the outer sleeve 2 and with shaft 13, with a linear motion, as shown in the accompanying drawings. The thickness of cylindrical outer sleeve 2 varies radially on its inner surface, considered in the circumferential direction. The axially extending concave portions 7 and the sloping faces 8 have a slight axial inclination near both ends of the assembly. The outer surface of sleeve 3 registers with the concave portions 7 of outer sleeve 2.

The thickness of inner sleeve 3 varies on the outer surface, considered in the circumferential direction. Balls 1 circulate along the axially extending convex portions 11, and also along the axially extending convex portions 6 formed on the inner surface of outer sleeve 2. Slant faces 8 and the ranges of the concave portions 7 increase in depth, with a slight clearance between them. Oblong guide grooves 12 leading from slots 14 and curving at both ends are formed so that balls 1 may have bearing contact between convex portions 6 and shaft 13. The inner sleeve and the outer sleeve are combined with insertion of balls 1 into the guide grooves formed in the inner sleeve.

The axial locating of both sleeves is effected by fitting rings 4 into the circumferential grooves 9 formed in the outer sleeve near its ends. The bush according to the invention is characterized by the advantages mentioned in addition to the formation of the inner sleeve by the metal powder method. The bush with high precision and also high performance can be produced with low cost, so that it will contribute to the increase of the performance of machines.

What I claim is:

1. A linear antifriction bearing bush, for longitudinal movement of a shaft or the like, comprising, in combination, an outer sleeve having a substantially cylindrical outer surface and an inner surface formed with a plurality of axially extending radially inwardly concave and convex surface portions which alternate circumferentially of said inner surface; an inner sleeve constituting a ball retainer and having a substantially cylindrical inner surface and an outer surface formed with a plurality of axially extending radially outwardly concave and convex surface portions which alternate circumferentially of said outer surface; the number of said surface portions on said inner sleeve being equal to the number of said surface portions on said outer sleeve, and said surface portions of said sleeves mating and interfitting upon relative telescoping of said sleeves to effect and maintain angular registry of the latter; said inner sleeve being formed with endless substantially oblong ball race means extending axially and circumferentially thereof and elongated axially of said inner sleeve; and a plurality of balls disposed along each ball race means in contact with the inner surface of said outer sleeve; each endless ball race means including a groove extending axially of respective convex surface portion of said inner sleeve and a slot extending axially of the adjacent concave surface portion of said inner sleeve and opening through the inner surface of said inner sleeve; each groove having arcuate end portions connecting to arcuate end portions of the associated slot to complete the respective ball race means; each groove being radially aligned with a respective concave surface portion of said outer sleeve for rolling engagement of the balls with the groove and the associated concave surface portion of the outer sleeve; each slot being radially aligned with a respective convex surface portion of said outer sleeve for rolling engagement of the balls with a shaft or the like and with the associated convex surface portion of the outer sleeve, portions of said convex surface on said inner sleeve between the ball race means thereof engaging portions of the concave surface of the outer sleeve over a substantial peripheral extent.

2. A linear antifriction bearing bush, as claimed in claim 1, including retainer rings engaged in said outer sleeve adjacent each end of the latter and bearing against the end surfaces of said inner sleeve to maintain a predetermined axial registry of said inner and outer sleeves.

3. A linear antifriction bearing bush, as claimed in claim 2, in which the inner surface of said outer sleeve is formed with a pair of annular grooves, one adjacent each end of said outer sleeve; said retainer rings comprising dished, thin spring metal rings each having its outer periphery engaged in a respective annular groove.

4. A linear antifriction bearing bush, as claimed in claim 3, in which the end surfaces of said inner sleeve are frustro-conical surfaces sloping axially inwardly of said inner sleeve; said rings bearing against said frustro-conical end surfaces.

5. A linear antifriction bearing bush, as claimed in claim 1, in which said inner sleeve consists of bonded metal powder.

6. A linear antifriction bearing bush, as claimed in claim 1, in which said inner sleeve has a substantial wall thickness and said grooves have a minimum depth equal to the diameter of said balls.

7. A linear antifriction bearing bush, as claimed in claim 1, wherein the convex surface portions of said outer sleeve are formed with substantially planar bearing surfaces extending axially thereof and each radially aligned with a respective groove; said bearing surfaces having sloping ramps at each end.

References Cited

UNITED STATES PATENTS

| 2,559,292 | 7/1951 | Ferger | 308—6 |
| 2,576,269 | 11/1951 | Thomson | 308—6 |
| 2,981,569 | 4/1961 | Danly | 308—6 |
| 3,070,405 | 12/1962 | Hulck | 308—6 |

FOREIGN PATENTS 19,058  9/1963  Japan.

MARTIN P. SCHWADRON, *Primary Examiner.*

L. L. JOHNSON, *Assistant Examiner.*